W. C. Whitmore,
Horseshoe.
No. 84,462. Patented Nov. 24, 1868.
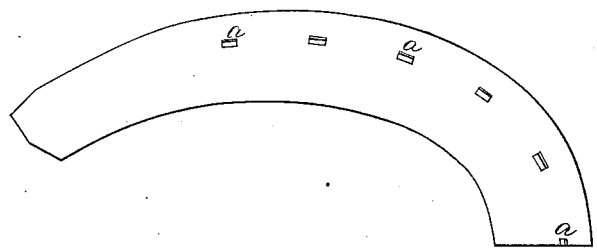
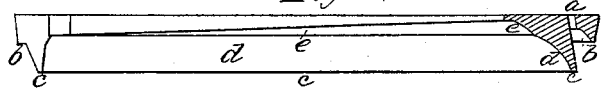
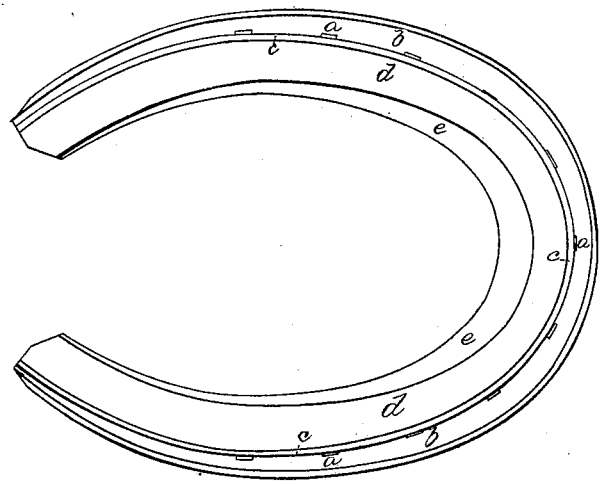
Witnesses:
S. N. Piper
J. R. Snow
Inventor:
Wm. C. Whitmore
by his attorney
R. H. Eddy

WILLIAM C. WHITMORE, OF MACON CITY, MISSOURI, ASSIGNOR TO ABIJAH RICHARDSON, OF BOSTON, MASSACHUSETTS.

Letters Patent No. 84,462, dated November 24, 1868.

IMPROVEMENT IN HORSE-SHOES.

*The Schedule referred to in these Letters Patent and making part of the same.*

*To all persons to whom these presents may come:*

Be it known that I, WILLIAM C. WHITMORE, late of Oldtown, in the county of Penobscot, and State of Maine, but now of Macon City, in the county of Macon, and State of Missouri, have invented a new and useful "Improvement in Horse-Shoes;" and do hereby declare the following to be a description of the same, reference being had to the accompanying drawings, in which—

Figure 1 is a plan of half of the shoe.

Figure 2 is an elevation of fig. 1, or a longitudinal section of the shoe.

Figure 3 is an under-side or ground-view of the shoe.

Similar letters of reference refer to the same parts in the several figures.

The nature of my invention consists in a shoe, of iron or other material, as the case may be, flat, or bevelled on its upper side, and with its under surface having a channel or groove, and a rib around it, to project from or below such groove, and formed, on its inner side, with a concave slope or bevel, which, when the shoe is in use, serves to prevent what is termed "balling."

The groove allows the toe, as well as the sides of the shoe, to be secured to the hoof of a horse by nails, and the rib acts as a calk, and causes the hoof to take an even bearing upon the shoe.

To enable others skilled in the art to make and use my invention, I will proceed to describe its construction and operation.

Figure 1 represents a plan of half of the shoe, or, in other words, of half of the upper surface or face that is to rest against the sole of the hoof of an animal.

$a\ a\ a$, figs. 1, 2, and 3, are nail-holes, to receive the nails for securing the shoe to the hoof. These holes are represented as made with a slight inward inclination, as seen more particularly at $a$, in fig. 2, and may be of any number, and arranged in the toe, as well as the sides of the shoe, if required.

In figs. 2 and 3, $b\ b$ is a groove or channel, and $c\ c\ c$ a projecting rib, both running around the shoe, the several nail-holes being made to open out of the groove $b\ b$. The projecting rib $c\ c\ c$ extends some distance below the groove $b\ b$, and may be of the same depth all around from the upper surface of the shoe. It may be made sharp or somewhat flat at its edge, where, when the shoe is in use, it is to touch the ground. The said rib is shown as bevelled on its inner side, with one or more concave sweeps, $d\ d,\ e\ e$.

When the shoe, so made, is in use, the lower edge of the projecting rib $c\ c\ c$ rests on the ground, and serves as a calk, to prevent the animal from slipping, the edge of the rib biting or holding firmly on the ground, and the concave bevel-shape on the interior, $d\ d,\ e\ e$, serving to prevent the shoes from balling or collecting snow or ice or stiff mud.

The rib $c\ c\ c$, projecting down beyond the groove, may be of any proper depth, and if of equal depth from the upper surface all around the shoe, it will allow of the pressure of the hoof being more equally distributed and sustained upon the shoe.

The groove or channel $b\ b$ permits of the shoe being nailed on at the toe as well as at the sides, the groove and rib serving to screen or protect the heads of the several nails from destructive wear and injury, which, if the front nails were not so protected, they would be particularly liable to.

I am aware that before my invention a horse-shoe has been made with one or more grooves in its tread or ground-surface, such groove or grooves being to receive the heads of the nails used in securing the shoe to a hoof.

I am also aware that a shoe has been made of a bar, having a flat triangular transverse section, such shoes being as represented in plate 30, volume ii, of a work published in London, and termed "The Complete Farmer."

I am also aware of the horse-shoe shown in plate 5, volume vii, of the first series of "Newton's Journal of Arts."

My shoe, as a whole, differs from all of these, although having several features corresponding with what is found in them; for the projecting rib of my shoe is arranged so as to extend some distance (viz, about half an inch,) below the groove, for receiving the nail-heads, in consequence of which the nail-heads, when the shoe is in use, are not only perfectly protected from contact with stones or hard matters, liable to do injury to them, but the rib or continuous calk is able to sink into the surface trodden on without hindrance from the part in which the groove is made.

When two parallel ribs are formed on a shoe, and the nail-holes are placed in the groove between the ribs, the said groove, when the shoe is in use, is liable to fill with earth or snow, which destroys or materially modifies the calking-properties of the ribs, causing them to slip on ice, and preventing it from taking proper hold thereon. The inner rib, also, will operate to estop the outer rib from penetrating the ice or snow. Therefore it will be seen that the shoe, having the single rib to project beyond the groove, and made with a bevelled inner surface, will not only freely penetrate the ice or earth, and free itself therefrom, and not ball up, but will protect the nail-heads of the groove to very much better advantage than any of the other shoes hereinbefore mentioned.

I therefore claim as my invention—

1. My improved horse-shoe, constructed with the single continuous rib $c$, one or more bevels or inclined inner faces, $d\ e$, a continuous groove, $b$, and nail-holes $a$, arranged as described, the rib $c$, under such arrangement, being made to project down below the groove $b$, or the part in which such groove is made, the whole being substantially as specified.

2. Further, a horse-shoe having a continuous groove, in which are the nail-holes, and surrounding a single continuous rib or calk, when constructed in the manner substantially as described.

WM. C. WHITMORE.

Witnesses:
DUNCAN McLEOD,
JNO. LOUDON.